United States Patent
Iwaya et al.

(10) Patent No.: US 10,536,086 B2
(45) Date of Patent: Jan. 14, 2020

(54) CONVERTER APPARATUS

(71) Applicant: TDK CORPORATION, Tokyo (JP)

(72) Inventors: Kazuki Iwaya, Tokyo (JP); Hiroshige Yanagi, Tokyo (JP); Natsumi Ogawa, Niigata (JP); Toshimasa Miyazaki, Niigata (JP)

(73) Assignee: TDK CORPORATION, Tokyo (JP)

( * ) Notice: Subject to any disclaimer, the term of this patent is extended or adjusted under 35 U.S.C. 154(b) by 227 days.

(21) Appl. No.: 15/846,324

(22) Filed: Dec. 19, 2017

(65) Prior Publication Data

US 2018/0183344 A1 Jun. 28, 2018

(30) Foreign Application Priority Data

Dec. 27, 2016 (JP) .................................. 2016-252596

(51) Int. Cl.
*H02M 3/335* (2006.01)
*H02M 1/08* (2006.01)

(52) U.S. Cl.
CPC ... *H02M 3/33584* (2013.01); *H02M 3/33592* (2013.01); *H02M 1/081* (2013.01)

(58) Field of Classification Search
CPC ......... H02M 3/33584; H02M 3/33592; H02M 1/081
USPC ........................................................ 307/19
See application file for complete search history.

(56) References Cited

U.S. PATENT DOCUMENTS

| | | | | |
|---|---|---|---|---|
| 7,362,601 B2* | 4/2008 | Uematsu | ................. | H02J 9/061 307/44 |
| 8,570,006 B2* | 10/2013 | Moussaoui | ......... | H02M 3/1582 323/222 |
| 8,854,840 B2* | 10/2014 | Lin | .................... | H02M 3/33592 363/21.06 |
| 9,077,257 B2* | 7/2015 | Frium | ..................... | H03F 3/217 |
| 2007/0076446 A1* | 4/2007 | Shiga | ................ | H02M 3/33561 363/17 |
| 2008/0297248 A1* | 12/2008 | Honda | .................. | H03F 3/2173 330/251 |

FOREIGN PATENT DOCUMENTS

JP 2011-155837 A 8/2011

* cited by examiner

*Primary Examiner* — Alfonso Perez Borroto
(74) *Attorney, Agent, or Firm* — Greenblum & Bernstein, P.L.C.

(57) ABSTRACT

A converter apparatus includes: a first transformer with two windings; a first full-bridge circuit with four switches, DC input/output units connected to a first DC power supply, and AC input/output units connected via an inductor to one winding of the first transformer; a second full-bridge circuit with four switches, DC input/output units connected to a second DC power supply, and AC input/output units connected via an inductor to another winding of the first transformer; a second transformer with two windings, one being connected via an inductor to the AC input/output units of the first circuit; a third full-bridge circuit with four switches, DC input/output units connected to a third DC power supply, and AC input/output units connected via an inductor to another winding of the second transformer; and a control unit for controlling the switches to supply power between the first to third DC power supplies.

6 Claims, 7 Drawing Sheets

| POWER FLOWS | PHASE STATE OF VOLTAGE Vac2 RELATIVE TO VOLTAGE Vac1 | PHASE STATE OF VOLTAGE Vac3 RELATIVE TO VOLTAGE Vac1 | RELATIVE MAGNITUDES OF PHASE DIFFERENCE Φb AND PHASE DIFFERENCE Φc |
|---|---|---|---|
| 1. POWER SUPPLY PS1 → POWER SUPPLY PS2, POWER SUPPLY PS3 | LAG | LAG | — |
| 2. POWER SUPPLY PS1 → POWER SUPPLY PS2, POWER SUPPLY PS3 | LAG | LEAD | $|\Phi b| > |\Phi c|$ |
| 3. POWER SUPPLY PS1 ← POWER SUPPLY PS2 → POWER SUPPLY PS3 | LAG | LEAD | $|\Phi b| < |\Phi c|$ |
| 4. POWER SUPPLY PS1 ← POWER SUPPLY PS2 → POWER SUPPLY PS3 | LEAD | LAG | $|\Phi b| > |\Phi c|$ |
| 5. POWER SUPPLY PS1 → POWER SUPPLY PS2, POWER SUPPLY PS3 | LEAD | LAG | $|\Phi b| < |\Phi c|$ |
| 6. POWER SUPPLY PS1 ← POWER SUPPLY PS2, POWER SUPPLY PS3 | LEAD | LEAD | — |

CONTROL

| POWER Pb | POWER Pc | POWER Pd | POWER Pa | RELATIVE MAGNITUDES OF PHASE DIFFERENCES Φb, Φc, AND Φd |
|---|---|---|---|---|
| POSITIVE (Φb: LAG) | POSITIVE (Φc: LAG) | POSITIVE (Φd: LAG) | NEGATIVE | — |
| POSITIVE (Φb: LAG) | POSITIVE (Φc: LAG) | NEGATIVE (Φd: LEAD) | NEGATIVE | $|Φb|+|Φc|>|Φd|$ |
| | | | POSITIVE | $|Φb|+|Φc|<|Φd|$ |
| POSITIVE (Φb: LAG) | NEGATIVE (Φc: LEAD) | POSITIVE (Φd: LAG) | NEGATIVE | $|Φb|+|Φd|>|Φc|$ |
| | | | POSITIVE | $|Φb|+|Φd|<|Φc|$ |
| POSITIVE (Φb: LAG) | NEGATIVE (Φc: LEAD) | NEGATIVE (Φd: LEAD) | NEGATIVE | $|Φb|>|Φc|+|Φd|$ |
| | | | POSITIVE | $|Φb|<|Φc|+|Φd|$ |
| NEGATIVE (Φb: LEAD) | POSITIVE (Φc: LAG) | POSITIVE (Φd: LAG) | NEGATIVE | $|Φc|+|Φd|>|Φb|$ |
| | | | POSITIVE | $|Φc|+|Φd|<|Φb|$ |
| NEGATIVE (Φb: LEAD) | POSITIVE (Φc: LAG) | NEGATIVE (Φd: LEAD) | NEGATIVE | $|Φc|>|Φb|+|Φd|$ |
| | | | POSITIVE | $|Φc|<|Φb|+|Φd|$ |
| NEGATIVE (Φb: LEAD) | NEGATIVE (Φc: LEAD) | POSITIVE (Φd: LAG) | NEGATIVE | $|Φd|>|Φb|+|Φc|$ |
| | | | POSITIVE | $|Φd|<|Φb|+|Φc|$ |
| NEGATIVE (Φb: LEAD) | NEGATIVE (Φc: LEAD) | NEGATIVE (Φd: LEAD) | POSITIVE | — |

FIG. 11

CONVERTER APPARATUS

FIELD OF THE INVENTION

The present invention relates to a converter apparatus that is disposed between a plurality of direct current (DC) power supplies and is capable of exchanging power between arbitrarily selected power supplies out of the connected power supplies.

DESCRIPTION OF THE RELATED ART

One example of a known converter apparatus of this type is the DC-DC converter disclosed in Patent Literature 1 (Japanese Laid-open Patent Publication No. 2011-155837). This DC-DC converter connects a first voltage to the primary side of a transformer and outputs a plurality of voltages from the secondary side of the transformer. This DC-DC converter is equipped with a first main circuit disposed between the first voltage and the primary side of the transformer, a second main circuit disposed between the secondary side of the transformer and a second voltage, a third main circuit disposed between the secondary side of the transformer and a third voltage, a first control circuit that bidirectionally converts voltages between the first voltage and the second voltage by performing on/off control of a switching means provided in the first main circuit and a switching means provided in the second main circuit, and a second control circuit that boosts a third voltage by performing on/off control of a switching means provided in the third main circuit, inputs the boosted voltage, and outputs the boosted voltage to the first voltage or the second voltage.

With this DC-DC converter, by having the first control circuit perform on/off control of the switching means in the first main circuit and the second main circuit and having the second control circuit perform on/off control of the switching means in the third main circuit, it is possible: to use the first voltage as an input voltage, output power from the second main circuit to the second voltage, and output power from the third main circuit to the third voltage; to use the second voltage as an input voltage, output power from the first main circuit to the first voltage, and output power from the third main circuit to the third voltage; and to use the third voltage as an input voltage, output power from the first main circuit to the first voltage, and output power from the second main circuit to the second voltage.

In other words, it is possible to output power based on an arbitrary voltage selected out of the first voltage, the second voltage, and the third voltage to the remaining two voltages.

SUMMARY OF THE INVENTION

However, the converter apparatus described above has the following problem to be solved. That is, with the above converter apparatus, although it is possible to output power to the two other voltages based on an arbitrary voltage selected out of the first voltage, the second voltage, and the third voltage, there is the problem that it is not possible to output power to one voltage based on two voltages arbitrarily selected out of the first voltage, the second voltage, and the third voltage.

The present invention was conceived to solve the problem described above and it is a primary object of the invention to provide a converter apparatus that is disposed between a plurality of DC power supplies and is capable of freely exchanging power between the power supplies.

To achieve the stated object, the converter apparatus according to the present invention comprises a first transformer in which a pair of first windings are formed; a first switching circuit that is constructed of four switches connected in a full bridge configuration, has direct current (DC) input/output units connected to a first DC power supply, has alternating current (AC) input/output units connected via a first inductor to one winding out of the pair of first windings of the first transformer, and converts power; a second switching circuit that is constructed of four switches connected in a full bridge configuration, has DC input/output units connected to a second DC power supply, has AC input/output units connected via a second inductor to another winding out of the pair of first windings of the first transformer, and converts power; a second transformer in which a pair of second windings are formed, with one winding out of the pair of second windings being connected via a third inductor to the AC input/output units of the first switching circuit; a third switching circuit that is constructed of four switches connected in a full bridge configuration, has DC input/output units connected to a third DC power supply, has AC input/output units connected via a fourth inductor to another winding out of the pair of second windings of the second transformer, and converts power; and a control unit that executes switching control over the switches of the first switching circuit, the second switching circuit, and the third switching circuit to have power supplied between the first DC power supply, the second DC power supply, and the third DC power supply.

Also, the converter apparatus according to the present invention, wherein the control unit controls directions of supplying of power between the first DC power supply, the second DC power supply, and the third DC power supply to arbitrary directions by executing phase control over a phase of a second voltage, which is generated between the AC input/output units of the second switching circuit and has a phase of a first voltage generated between the AC input/output units of the first switching circuit as a reference, and over a phase of a third voltage, which is generated between the AC input/output units of the third switching circuit and has the phase of the first voltage as a reference, the phase control being selected out of: phase control that sets the phase of the second voltage and the phase of the third voltage at phases that lead the phase of the first voltage; phase control that sets the phase of the second voltage and the phase of the third voltage at phases that lag the phase of the first voltage; and phase control that sets one phase out of the phase of the second voltage and the phase of the third voltage at a phase that leads the phase of the first voltage and another phase at a phase that lags the phase of the first voltage, and controls relative magnitudes of an absolute value of a phase difference between the first voltage and the second voltage and an absolute value of a phase difference between the first voltage and the third voltage.

In this way, in this converter apparatus, a first DAB converter constructed of the first transformer, the first switching circuit, and the second switching circuit and another DAB converter constructed of the second transformer, the first switching circuit, and the third switching circuit are disposed between three DC power supplies, and the control unit executes switching control over the respective switching circuits. More specifically, the control unit executes phase control that is one of the three types of phase control described above over the phase of the second voltage, which is generated between the AC input/output units of the second switching circuit and has the phase of the first voltage generated between the AC input/output units of the first switching circuit as a reference, and the phase of the third voltage, which is generated between the AC input/output units of the third switching circuit and has the phase of the first voltage as a reference.

Therefore, according to this converter apparatus, it is possible to supply power between three DC power supplies, that is to freely exchange power between three DC power supplies (that is, to supply power from an arbitrary DC power supply to the two other DC power supplies and from two arbitrary DC power supplies to the remaining DC power supply).

Also, the converter apparatus according to the present invention, wherein the control unit arbitrarily controls a magnitude of the power supplied to the second DC power supply by controlling the phase difference between the first voltage and the second voltage, arbitrarily controls a magnitude of the power supplied to the third DC power supply by controlling the phase difference between the first voltage and the third voltage, and arbitrarily controls a magnitude of the power supplied to the first DC power supply by controlling a difference between an absolute value of the phase difference between the first voltage and the second voltage and an absolute value of the phase difference between the first voltage and the third voltage.

According to this converter apparatus, the control unit is capable of arbitrarily controlling the magnitude of the power supplied to the second DC power supply by controlling the phase difference between the first voltage and the second voltage, of arbitrarily controlling the magnitude of the power supplied to the third DC power supply by controlling the phase difference between the first voltage and the third voltage, and of arbitrarily controlling the magnitude of the power supplied to the first DC power supply by controlling the difference between the respective absolute values of these two phase differences, so that it is possible to separately and arbitrarily control the power supplied to every DC power supply.

Also, the converter apparatus according to the present invention, wherein the control unit performs phase control that sets phases that lead the phase of the first voltage and phases that lag the phase of the first voltage respectively within a range of 0 to 90°, inclusive.

According to this converter apparatus, since the control unit performs phase control that sets phases that lead the phase of the first voltage and phases that lag the phase of the first voltage respectively within a range of 0 to 90°, inclusive, it is possible to increase the power supplied to the second DC voltage and/or the power supplied to the third DC voltage in a state where the polarity is positive as the phase lag increases and to increase the power supplied to the second DC voltage and/or the power supplied to the third DC voltage in a state where the polarity is negative as the phase lead increases. This means that it is possible to control the magnitudes of the power supplied to the second DC power supply and the power supplied to the third DC power supply in a state where the correspondence between the magnitude (extent) of the phase lead or phase lag and the magnitude of the power is easy to understand.

Also, the converter apparatus according to the present invention further comprises a third transformer in which a pair of third windings are formed; and a fourth switching circuit that is constructed of four switches connected in a full bridge configuration, has DC input/output units connected to a fourth DC power supply, has AC input/output units connected via a fifth inductor to one winding out of the pair of third windings of the third transformer, and converts power, wherein another winding out of the pair of third windings of the third transformer is connected, via a sixth inductor, to one out of the AC input/output units of the first switching circuit and the AC input/output units of the second switching circuit.

According to this converter apparatus, it is possible to supply power between four DC power supplies, that is, to freely exchange power between four DC power supplies (in other words, to supply power from any one of the DC power supplies to the three other DC power supplies, to supply power from any two DC power supplies to the other two DC power supplies, and to supply power from any three of the DC power supplies to the remaining DC power supply).

It should be noted that the disclosure of the present invention relates to a content of Japanese Patent Application 2016-252596 that was filed on 27 Dec. 2016 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a converter apparatus will now be described with reference to the attached drawings.

First, as one example of a converter apparatus, the configuration of a converter apparatus 1A will be described with reference to FIG. 1. The converter apparatus 1A is equipped with a first transformer 2, a second transformer 3, a first inductor 4, a second inductor 5, a third inductor 6, a fourth inductor 7, a control unit 8, a first switching circuit 11, a second switching circuit 21, and a third switching circuit 31, and is disposed between a first DC power supply PS1 (hereinafter also referred to as the "power supply PS1"), a second DC power supply PS2 (hereinafter also referred to as the "power supply PS2"), and a third DC power supply PS3 (hereinafter also referred to as the "power supply PS3"). The converter apparatus 1A is configured to supply power (or to control "power flows") between the power supplies PS1, PS2, and PS3 that are insulated from each other by the first transformer 2 and the second transformer 3.

In more detail, a pair of first windings 2a and 2b that are magnetically coupled are formed in the first transformer 2. Similarly, a pair of second windings 3a and 3b that are magnetically coupled are formed in the second transformer 3. The first transformer 2 and the second transformer 3 are constructed separately, and the windings 2a and 2b and the windings 3a and 3b are not magnetically coupled. Here, it is assumed that a relationship $\alpha(=N1a/N1b)$ is established between the number of turns N1a in the winding 2a and the number of turns N1b in the winding 2b. Since the number of turns N2a is set as being equal to the number of turns N1a, it is assumed that a relationship $\beta(=N1a/N2b)$ is established between the number of turns N1a in the winding 2a and the number of turns N1b in the winding 2b.

The first inductor 4 and the second inductor 5 are constructed for example of leakage inductances of the first transformer 2, and the third inductor 6 and the fourth inductor 7 are constructed for example of leakage inductances of the second transformer 3. It is assumed that the inductance values of the first inductor 4 and the second inductor 5 are expressed by the symbols L1a and L1b and the inductance values of the third inductor 6 and the fourth inductor 7 are expressed by the symbols L2a and L2b. Note that since the number of turns N2a and the number of turns N1a are set equal in the present embodiment as described above, the inductance value L2a of the third inductor 6 is set equal to the inductance value L1a of the first inductor 4 (L2a=L1a). For this reason, it is assumed below that the inductance value of the third inductor 6 is expressed by the symbol L1a. Note that in place of the leakage inductances, the first inductor 4 to the fourth inductor 7 may be constructed of inductors that are externally attached to the transformers 2 and 3.

Based for example on an operation instruction inputted from outside, the control unit 8 executes switching control over switches 12 to 15, 22 to 25, and 32 to 35, described later, that construct the first switching circuit 11, the second switching circuit 21, and the third switching circuit 31 so that the flow of power in the converter apparatus 1A becomes the flow indicated by the operation instruction (one of the six types of power flows depicted in FIG. 8).

More specifically, by controlling the respective phases of the driving signals S1a to S1d, S2a to S2d, and S3a to S3d (voltage signals that have rectangular waveforms and as one example a duty ratio of 0.5) for the switches 12 to 15, 22 to 25, and 32 to 35, the control unit 8 executes switching control over the switches 12 to 15, 22 to 25, and 32 to 35 to execute phase control over the phase of a second AC voltage Vac2, which is generated between AC input/output units 28 and 29, described later, of the second switching circuit 21 and has the phase of a first AC voltage Vac1 generated between AC input/output units 18 and 19, described later, of the first switching circuit 11 as a reference, and over the phase of a third AC voltage Vac3, which is generated between AC input/output units 38 and 39, described later, of the third switching circuit 31 and has the phase of a first AC voltage Vac1 as a reference. More specifically, by executing switching control over the switches 12 to 15, 22 to 25, and 32 to 35 of the switching circuits 11, 21, and 31, the control unit 8 controls a phase difference Φb of the second AC voltage Vac2 relative to the first AC voltage Vac1 and a phase difference Φc of the third AC voltage Vac3 relative to the first AC voltage Vac1 (that is, the control unit 8 executes phase control over the first AC voltage Vac1, the second AC voltage Vac2, and the third AC voltage Vac3 relative to each other).

The first switching circuit 11 is constructed of the four switches 12, 13, 14, and 15 that are connected in a full bridge configuration in a state where DC input/output units 16 and 17 are connected to the power supply PS1 so that the DC input/output unit 16 side becomes a high potential. The AC input/output units 18 and 19 of the first switching circuit 11 are connected via the first inductor 4 to one winding 2a out of the windings 2a and 2b of the first transformer 2, so that the first switching circuit 11 is capable of power conversion between DC and AC (i.e., between a first DC voltage Vdc1 (the voltage of the power supply PS1, hereinafter also referred to as the "voltage Vdc1") and a first AC voltage Vac1 (hereinafter referred to as the "voltage Vac1") as the first voltage generated between the AC input/output units 18 and 19). As one example in the present embodiment, the first inductor 4 is connected between the AC input/output unit 18 and one end of the winding 2a. The AC input/output unit 19 is connected to the other end of the winding 2a.

The AC input/output units 18 and 19 of the first switching circuit 11 are also connected via the third inductor 6 to one winding 3a out of the windings 3a and 3b of the second transformer 3. As one example in the present embodiment, the third inductor 6 is connected between the AC input/output unit 18 and one end of the winding 3a. The AC input/output unit 19 is connected to the other end of the winding 3a.

The second switching circuit 21 is constructed of the four switches 22, 23, 24, and 25 that are connected in a full bridge configuration in a state where DC input/output units 26 and 27 are connected to the power supply PS2 so that the DC input/output unit 26 side becomes a high potential. The AC input/output units 28 and 29 of the second switching circuit 21 are connected via the second inductor 5 to the other winding 2b out of the windings 2a and 2b of the first transformer 2, so that the second switching circuit 21 is capable of power conversion between DC and AC (i.e., between a second DC voltage Vdc2 (the voltage of the power supply PS2, hereinafter also referred to as the "voltage Vdc2") and a second AC voltage Vac2 (hereinafter also referred to as the "voltage Vac2") as the second voltage generated between the AC input/output units 28 and 29). As one example in the present embodiment, the second inductor 5 is connected between the AC input/output unit 28 and one end of the other winding 2b. The AC input/output unit 29 is connected to the other end of the other winding 2b.

The third switching circuit 31 is constructed of the four switches 32, 33, 34, and 35 that are connected in a full bridge configuration in a state where DC input/output units 36 and 37 are connected to the power supply PS3 so that the DC input/output unit 36 side becomes a high potential. The AC input/output units 38 and 39 are connected via the fourth inductor 7 to the other winding 3b out of the windings 3a and 3b of the second transformer 3, so as to be capable of power conversion between DC and AC (i.e., between a third DC voltage Vdc3 (the voltage of the power supply PS3, hereinafter also referred to as the "voltage Vdc3") and a third AC voltage Vac3 (hereinafter also referred to as the "voltage Vac3") as the third voltage generated between the AC input/output units 38 and 39). As one example in the present embodiment, the fourth inductor 7 is connected between the AC input/output unit 38 and one end of the other winding 3b. The AC input/output unit 39 is connected to the other end of the other winding 3b.

Figure 1:
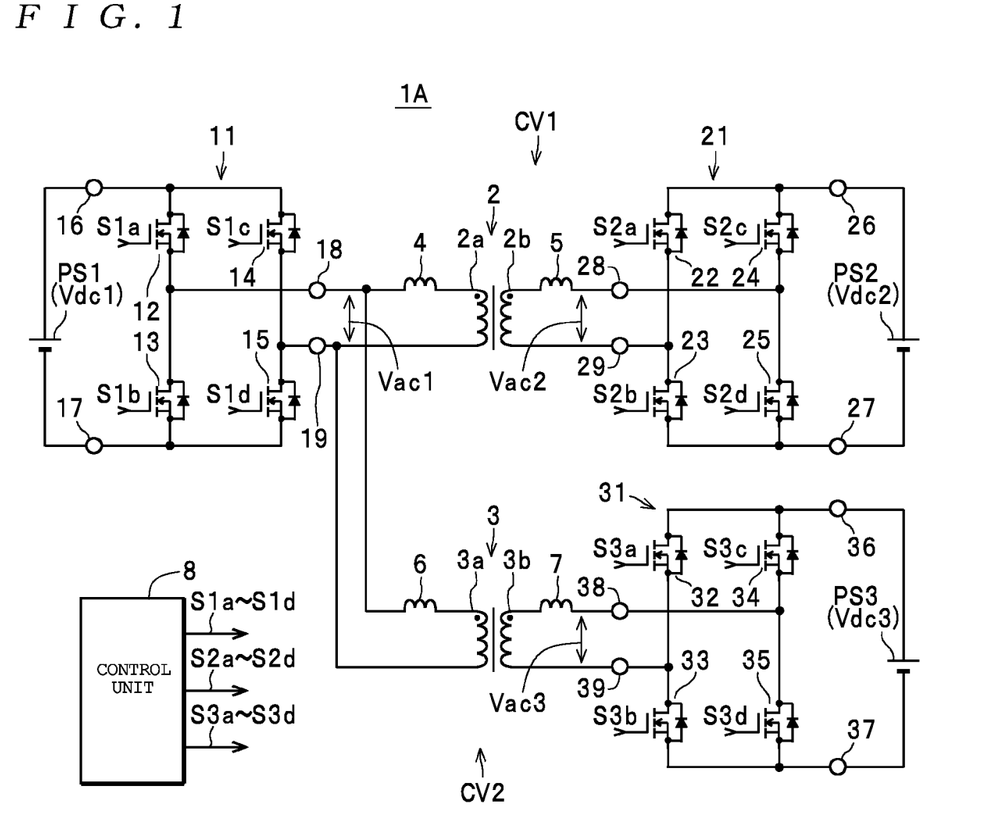
FIG. 1 is a diagram depicting the configuration of a converter apparatus.

Although freewheel diodes are connected in parallel to each of the switches 12 to 15, 22 to 25, and 32 to 35 as depicted in FIG. 1, when the switches 12 to 15, 22 to 25, and 32 to 35 are constructed of field effect transistors (MOSFET), it is possible to use the parasitic diodes of the transistors.

Also, with the converter apparatus 1A constructed as described above, a DAB (Dual Active Bridge)-type bidirectional converter (hereinafter also referred to as the "first DAB converter CV1") is constructed by the first transformer 2 and the first switching circuit 11 and the second switching circuit 21 that are connected to each other via the first transformer 2. Another DAB-type bidirectional converter (hereinafter also referred to as the "second DAB converter CV2") is constructed by the second transformer 3 and the first switching circuit 11 and the third switching circuit 31 that are connected to each other via the second transformer 3.

Figure 2:
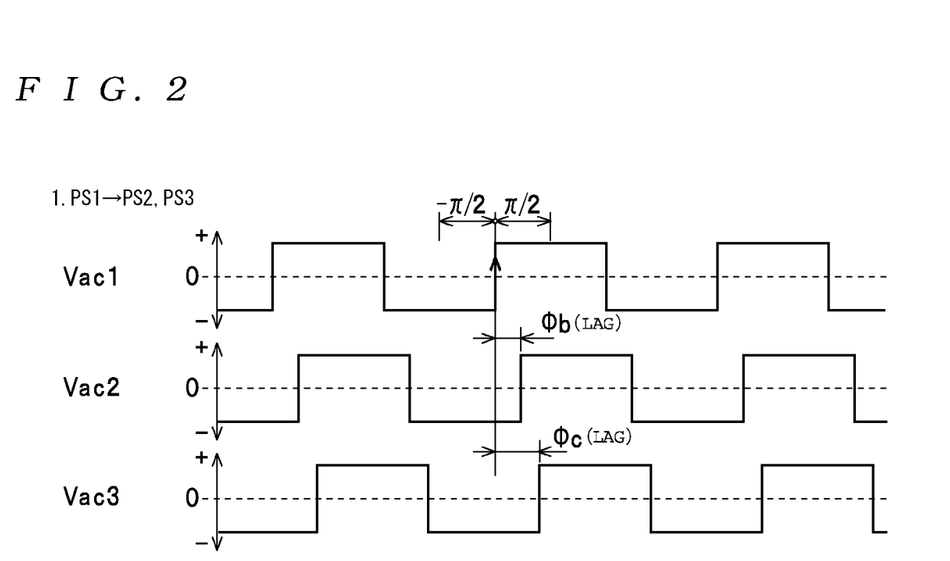
FIG. 2 is a waveform diagram useful in explaining phase states of phase differences Φb and Φc of a voltage Vac2 and a voltage Vac3 relative to a voltage Vac1 when power is supplied from a power supply PS1 to power supplies PS2 and PS3 of the converter apparatus.
Figure 3:
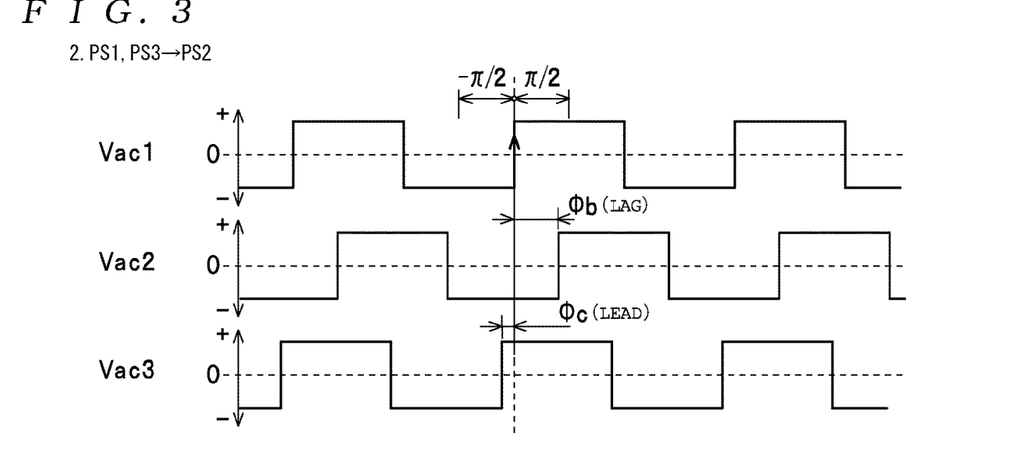
FIG. 3 is a waveform diagram useful in explaining phase states of the phase differences Φb and Φc of the voltage Vac2 and the voltage Vac3 relative to the voltage Vac1 when power is supplied from the power supplies PS1 and PS3 to the power supply PS2 of the converter apparatus.

The DAB-type converters will now be described with the first DAB converter CV1 described above as an example. As depicted in FIGS. 2 and 3, for the first DAB converter CV1, when the phase difference between the voltage Vac2 and the voltage Vac1 with the voltage Vac1 as the reference is expressed as Φb (where 0≤Φb≤π/2), the power Pb outputted (supplied) from the power supply PS1 to the power supply PS2 is expressed by Expression (1) below.

$$Pb=(Vdc1\times(1/\alpha)\times Vdc2)/[\omega((1/\alpha)^2\times L1a+L1b)]\times\Phi b\times(1-|\Phi b|/\pi) \quad (1)$$

Note that ω=2πf (where f is the switching frequency of the switches 12 to 15, 22 to 25, and 32 to 35).

Figure 5:
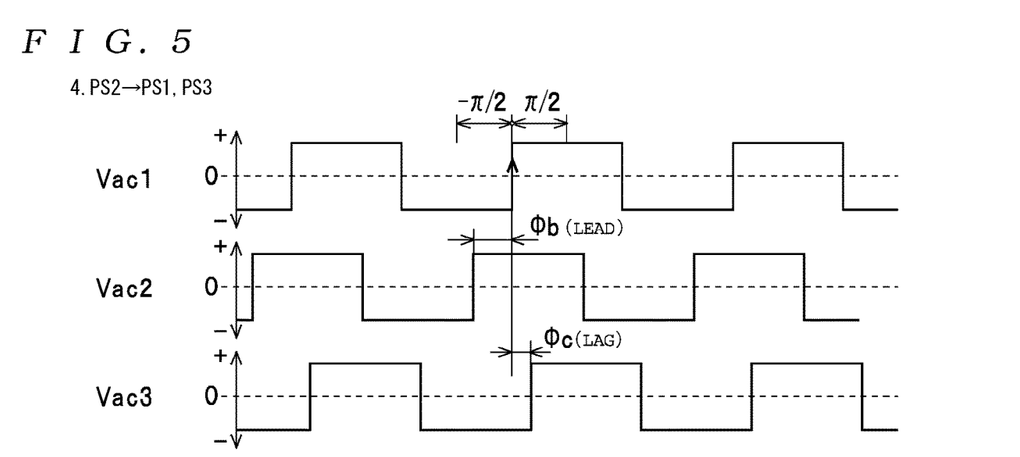
FIG. 5 is a waveform diagram useful in explaining the phase states of the phase differences Φb and Φc of the voltage Vac2 and the voltage Vac3 relative to the voltage Vac1 when power is supplied from the power supply PS2 to the power supplies PS1 and PS3 of the converter apparatus.
Figure 6:
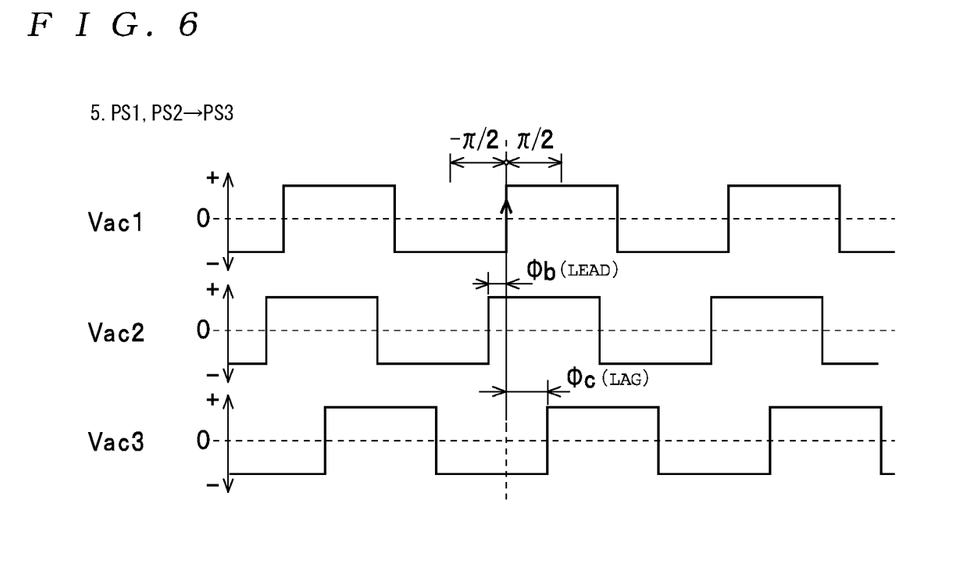
FIG. 6 is a waveform diagram useful in explaining the phase states of the phase differences Φb and Φc of the voltage Vac2 and the voltage Vac3 relative to the voltage Vac1 when power is supplied from the power supplies PS1 and PS2 to the power supply PS3 of the converter apparatus.
Figure 7:
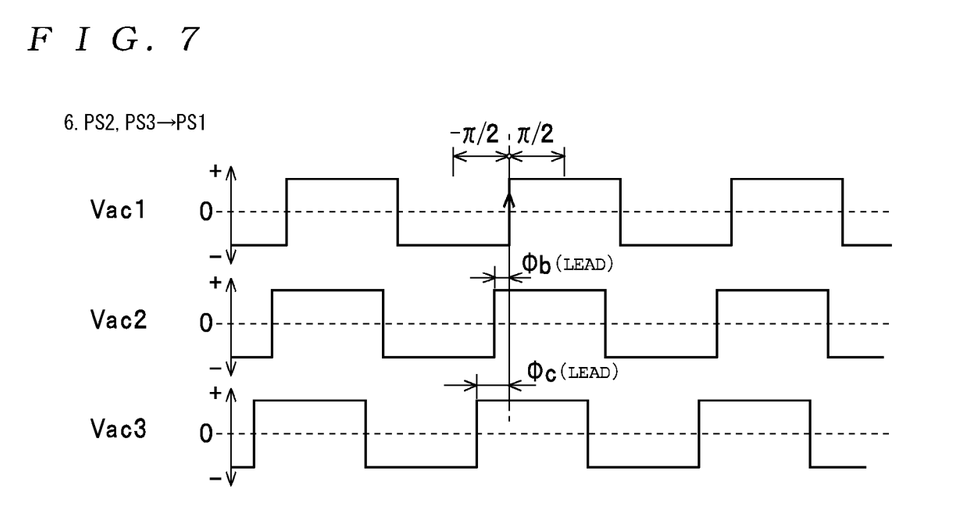
FIG. 7 is a waveform diagram useful in explaining the phase states of the phase differences Φb and Φc of the voltage Vac2 and the voltage Vac3 relative to the voltage Vac1 when power is supplied from the power supplies PS2 and PS3 to the power supply PS1 of the converter apparatus.

Accordingly, based on Expression (1), when the phase of the voltage Vac2 lags the voltage Vac1 as depicted in FIG. 2 (i.e., when Φb is positive), the first DAB converter CV1 supplies power from the power supply PS1 to the power supply PS2 (Pb>0), but when the phase of the voltage Vac2 leads the voltage Vac1 as depicted in FIG. 5 (i.e., when Φb is negative), the first DAB converter CV1 supplies minus power from the power supply PS1 to the power supply PS2 (Pb<0, which means that power is supplied from the power supply PS2 to the power supply PS1). Also, in the first DAB converter CV1, as |Φb| increases from zero, it is possible to gradually increase the absolute value of the power Pb from zero.

Figure 4:
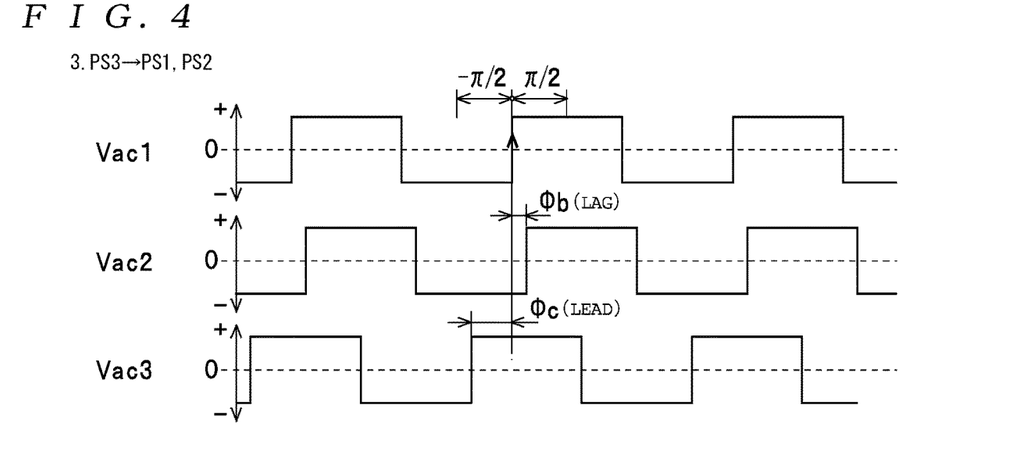
FIG. 4 is a waveform diagram useful in explaining phase states of the phase differences Φb and Φc of the voltage Vac2 and the voltage Vac3 relative to the voltage Vac1 when power is supplied from the power supply PS3 to the power supplies PS1 and PS2 of the converter apparatus.

For the second DAB converter CV2 also, in the same way as the first DAB converter CV1, as depicted in FIGS. 2 and 4, when the phase difference between the voltage Vac3 and the voltage Vac1 with the voltage Vac1 as the reference is expressed as Φc (where 0≤Φc≤π/2), the power Pc outputted (supplied) from the power supply PS1 to the power supply PS3 is expressed by Expression (2) below. Accordingly, when the phase of the voltage Vac3 lags the voltage Vac1 as depicted in FIG. 2 (i.e., when Φc is positive), the second DAB converter CV2 supplies power from the power supply PS1 to the power supply PS3 (Pc>0), but when the phase of the voltage Vac3 leads the voltage Vac1 as depicted in FIG. 4 (i.e., when Φc is negative), the second DAB converter CV2 supplies minus power from the power supply PS1 to the power supply PS3 (Pc<0, which means that power is supplied from the power supply PS3 to the power supply PS1). Also, in the second DAB converter CV2, as 10c1 increases from zero, it is possible to gradually increase the absolute value of the power Pc from zero.

$$Pc=(Vdc1\times(1/\beta)\times Vdc3)/[\omega((1/\beta)^2\times L1a+L2b)]\times\Phi c\times(1-|\Phi c|/\pi) \quad (2)$$

Also, based on the operation of the first DAB converter CV1 and the second DAB converter CV2 described above, the power Pa supplied from the power supply PS2 and the power supply PS3 to the power supply PS1 is expressed by Expression (3) below.

$$Pa=-Pb-Pc \quad (3)$$

Next, the operation of the converter apparatus 1A will be described with reference to FIGS. 1 to 8. The operation of the converter apparatus 1A is described below for each of six types of power flows.

First, a case where an operation instruction that sets the power flows at the converter apparatus 1A at the first power flows depicted in FIG. 8 has been inputted from outside into the control unit 8 will be described. In this case, the control unit 8 generates and outputs driving signals S1a to S1d, S2a to S2d, and S3a to S3d to the switches 12 to 15, 22 to 25, and 32 to 35 that construct the switching circuits 11, 21, and 31 so that the phase of the voltage Vac1 generated between the AC input/output units 18 and 19 of the first switching circuit 11, the phase of the voltage Vac2 generated between the AC input/output units 28 and 29 of the second switching circuit 21, and the phase of the voltage Vac3 generated between the AC input/output units 38 and 39 of the third switching circuit 31 are in the phase state depicted in FIG. 2 (that is, a phase state corresponding to the first power flows depicted in FIG. 8, where the voltage Vac2 lags the voltage Vac1 and the voltage Vac3 lags the voltage Vac1 is produced).

Here, the first DAB converter CV1 operates so that power is supplied from the power supply PS1 to the power supply PS2 (that is, so that the power Pb is positive) and the second DAB converter CV2 operates so that power is supplied from the power supply PS1 to the power supply PS3 (that is, so that the power Pc is positive). When this is the case, the power Pa indicated in Expression (3) above is negative. As a result, the converter apparatus 1A operates so that the power supplying state (or "power flows") between the power supplies PS1, PS2, and PS3 is the first power flows depicted in FIG. 8. Also, when the magnitudes of the power Pb and Pc are independently controlled while maintaining the first power flows, it is possible, by making the phase differences Φb and Φc separately approach zero degrees (i.e., by reducing the phase differences Φb and Φc), to separately reduce the power Pb and Pc, and by making the phase differences Φb and Φc separately approach π/2 (=90°) (i.e., by increasing the phase differences Φb and Φc), to separately increase the power Pb and Pc.

Next, a case where an operation instruction that sets the power flows at the converter apparatus 1A at the second power flows depicted in FIG. 8 has been inputted from outside into the control unit 8 will be described. In this case, the control unit 8 generates and outputs driving signals S1*a* to S1*d*, S2*a* to S2*d*, and S3*a* to S3*d* to the switches 12 to 15, 22 to 25, and 32 to 35 that construct the switching circuits 11, 21, and 31 so that the phases of the voltages Vac1, Vac2, and Vac3 are in the phase state depicted in FIG. 3 (that is, a phase state corresponding to the second power flows depicted in FIG. 8, where the voltage Vac2 lags the voltage Vac1 and the voltage Vac3 leads the voltage Vac1 and the absolute value of the phase difference Φb is larger than the absolute value of the phase difference Φc, is produced).

In this case, the first DAB converter CV1 operates so that power is supplied from the power supply PS1 to the power supply PS2 (that is, so that the power Pb is positive), but on the other hand, the second DAB converter CV2 operates so that power is supplied from the power supply PS3 to the power supply PS1 (that is, so that the power Pc is negative). Also, since the absolute value of the phase difference Φb is larger than the absolute value of the phase difference Φc, the absolute value of the power Pb is larger than the absolute value of the power Pc. When this is the case, the power Pa indicated in Expression (3) above is negative. By doing so, the power Pb is positive and the power Pa and Pc are negative, which results in the converter apparatus 1A operating so that the power supplying state (power flows) between the power supplies PS1, PS2, and PS3 is the second power flows depicted in FIG. 8.

Next, a case where an operation instruction that sets the power flows at the converter apparatus 1A at the third power flows depicted in FIG. 8 has been inputted from outside into the control unit 8 will be described. In this case, the control unit 8 generates and outputs driving signals S1*a* to S1*d*, S2*a* to S2*d*, and S3*a* to S3*d* to the switches 12 to 15, 22 to 25, and 32 to 35 that construct the switching circuits 11, 21, and 31 so that the phases of the voltages Vac1, Vac2, and Vac3 are in the phase state depicted in FIG. 4 (that is, a phase state corresponding to the third power flows depicted in FIG. 8, where the voltage Vac2 lags the voltage Vac1 and the voltage Vac3 leads the voltage Vac1 and the absolute value of the phase difference Φb is smaller than the absolute value of the phase difference Φc, is produced).

In this case, the first DAB converter CV1 operates so that power is supplied from the power supply PS1 to the power supply PS2 (that is, so that the power Pb is positive), but on the other hand, the second DAB converter CV2 operates so that power is supplied from the power supply PS3 to the power supply PS1 (that is, so that the power Pc is negative). Also, since the absolute value of the phase difference Φb is smaller than the absolute value of the phase difference Φc, the absolute value of the power Pb is smaller than the absolute value of the power Pc. When this is the case, the power Pa indicated in Expression (3) above is positive. By doing so, the power Pa and Pb are positive and the power Pc is negative, which results in the converter apparatus 1A operating so that the power supplying state (power flows) between the power supplies PS1, PS2, and PS3 is the third power flows depicted in FIG. 8.

Next, a case where an operation instruction that sets the power flows at the converter apparatus 1A at the fourth power flows depicted in FIG. 8 has been inputted from outside into the control unit 8 will be described. In this case, the control unit 8 generates and outputs driving signals S1*a* to S1*d*, S2*a* to S2*d*, and S3*a* to S3*d* to the switches 12 to 15, 22 to 25, and 32 to 35 that construct the switching circuits 11, 21, and 31 so that the phases of the voltages Vac1, Vac2, and Vac3 are in the phase state depicted in FIG. 5 (that is, a phase state corresponding to the fourth power flows depicted in FIG. 8, where the voltage Vac2 leads the voltage Vac1 and the voltage Vac3 lags the voltage Vac1, and the absolute value of the phase difference Φb is larger than the absolute value of the phase difference Φc, is produced).

In this case, the first DAB converter CV1 operates so that power is supplied from the power supply PS2 to the power supply PS1 (that is, so that the power Pb is negative), but on the other hand, the second DAB converter CV2 operates so that power is supplied from the power supply PS1 to the power supply PS3 (that is, so that the power Pc is positive). Also, since the absolute value of the phase difference Φb is larger than the absolute value of the phase difference Φc, the absolute value of the power Pb is larger than the absolute value of the power Pc. When this is the case, the power Pa indicated in Expression (3) above is positive. By doing so, the power Pa and Pc are positive and the power Pb is negative, which results in the converter apparatus 1A operating so that the power supplying state (power flows) between the power supplies PS1, PS2, and PS3 is the fourth power flows depicted in FIG. 8.

Next, a case where an operation instruction that sets the power flows at the converter apparatus 1A at the fifth power flows depicted in FIG. 8 has been inputted from outside into the control unit 8 will be described. In this case, the control unit 8 generates and outputs driving signals S1*a* to S1*d*, S2*a* to S2*d*, and S3*a* to S3*d* to the switches 12 to 15, 22 to 25, and 32 to 35 that construct the switching circuits 11, 21, and 31 so that the phases of the voltages Vac1, Vac2, and Vac3 are in the phase state depicted in FIG. 6 (that is, a phase state corresponding to the fifth power flows depicted in FIG. 8, where the voltage Vac2 leads the voltage Vac1 and the voltage Vac3 lags the voltage Vac1, and the absolute value of the phase difference Φb is smaller than the absolute value of the phase difference Φc, is produced).

In this case, the first DAB converter CV1 operates so that power is supplied from the power supply PS2 to the power supply PS1 (that is, so that the power Pb is negative), but on the other hand, the second DAB converter CV2 operates so that power is supplied from the power supply PS1 to the power supply PS3 (that is, so that the power Pc is positive). Also, since the absolute value of the phase difference Φb is smaller than the absolute value of the phase difference Φc, the absolute value of the power Pb is smaller than the absolute value of the power Pc. When this is the case, the power Pa indicated in Expression (3) above is negative. By doing so, the power Pa and Pb are negative and the power Pc is positive, which results in the converter apparatus 1A operating so that the power supplying state (power flows) between the power supplies PS1, PS2, and PS3 is the fifth power flows depicted in FIG. 8.

Also, with the second to fifth power flows described above, when the magnitude of the power Pb is independently controlled while maintaining the respective power flows, it is possible, while ensuring that the phase state between the phase difference Φb and the phase difference Φc satisfies the state described above, to reduce the power Pb by making the phase difference Φb approach 0° (i.e., by reducing the phase difference Φb) and to increase the power Pb by making the phase difference Φb approach π/2 (i.e., by increasing the phase difference Φb). For the power Pc also, it is possible, while ensuring that the phase state between the phase difference Φb and the phase difference Φc satisfies the state described above, to reduce the power Pc by making the phase difference Φc approach 0° (i.e., by reducing the phase difference Φc) and to increase the power Pc by making the phase difference approach π/2 (i.e., by increasing the phase difference Φc). For the power Pa also, it is possible, while ensuring that the phase state between the phase difference Φb and the phase difference Φc satisfies the state described above, to reduce the power Pa by having the difference between the absolute value of the phase difference Φb and the absolute value of the phase difference Φc approach zero (i.e., by reducing the difference between the absolute values) and to increase the power Pa by increasing the difference between the absolute values.

Finally, a case where an operation instruction that sets the power flows at the converter apparatus 1A at the sixth power flows depicted in FIG. 8 has been inputted from outside into the control unit 8 will be described. In this case, the control unit 8 generates and outputs driving signals S1a to S1d, S2a to S2d, and S3a to S3d to the switches 12 to 15, 22 to 25, and 32 to 35 that construct the switching circuits 11, 21, and 31 so that the phases of the voltages Vac1, Vac2, and Vac3 are in the phase state depicted in FIG. 7 (that is, a phase state corresponding to the sixth power flows depicted in FIG. 8, where the voltage Vac2 leads the voltage Vac1 and the voltage Vac3 also leads the voltage Vac1, is produced).

In this case, the first DAB converter CV1 operates so that power is supplied from the power supply PS2 to the power supply PS1 (that is, so that the power Pb is negative), and the second DAB converter CV2 operates so that power is supplied from the power supply PS3 to the power supply PS1 (that is, so that the power Pc is negative). When this is the case, the power Pa indicated in Expression (3) described above is positive. By doing so, the power Pa is positive and the power Pb and Pc are negative, which results in the converter apparatus 1A operating so that the power supplying state (power flows) between the power supplies PS1, PS2, and PS3 is the sixth power flows depicted in FIG. 8. Also, when the magnitudes of the power Pb and Pc are independently controlled while maintaining the sixth power flows, it is possible, by making the phase differences Φb and Φc separately approach zero degrees (i.e., by reducing the phase differences Φb and Φc), to separately reduce the power Pb and Pc, and by making the phase differences Φb and Φc separately approach π/2 (=90°) (i.e., by increasing the phase differences Φb and Φc), to separately increase the power Pb and Pc.

Note that since the power Pb becomes zero when the phase difference Φb is set at zero, the exchanging of power between the power supply PS1 and the power supply PS2 is stopped. Also, since the power Pc becomes zero when the phase difference Φc is set at zero, the exchanging of power between the power supply PS1 and the power supply PS3 is stopped.

In this way, in the converter apparatus 1A, the first DAB converter CV1 constructed of the first transformer 2, the first switching circuit 11, and the second switching circuit 21 and the second DAB converter CV2 constructed of the second transformer 3, the first switching circuit 11, and the third switching circuit 31 are disposed between the three power supplies PS1, PS2, and PS3 and the control unit 8 executes switching control over the switches 12 to 15, 22 to 25, and 32 to 35 of the switching circuits 11, 21, and 31.

More specifically, the control unit 8 executes phase control over the phase of the voltage Vac2 that has the phase of the voltage Vac1 as a reference and the voltage Vac3 that has the phase of the voltage Vac1 as a reference. This phase control is one of:

phase control that causes both the phase of the voltage Vac2 and the phase of the voltage Vac3 to lead the phase of the voltage Vac1;

phase control that causes both the phase of the voltage Vac2 and the phase of the voltage Vac3 to lag the phase of the voltage Vac1; and phase control that causes one out of the phase of the voltage Vac2 and the phase of the voltage Vac3 to lead the phase of the voltage Vac1 and causes the other out of the phase of the voltage Vac2 and the phase of the voltage Vac3 to lag the phase of the voltage Vac1, and also controls the relative magnitudes of the absolute value of the phase difference Φb between the voltage Vac1 and the voltage Vac2 and the absolute value of the phase difference Φc between the voltage Vac1 and the voltage Vac3.

Figure 8:
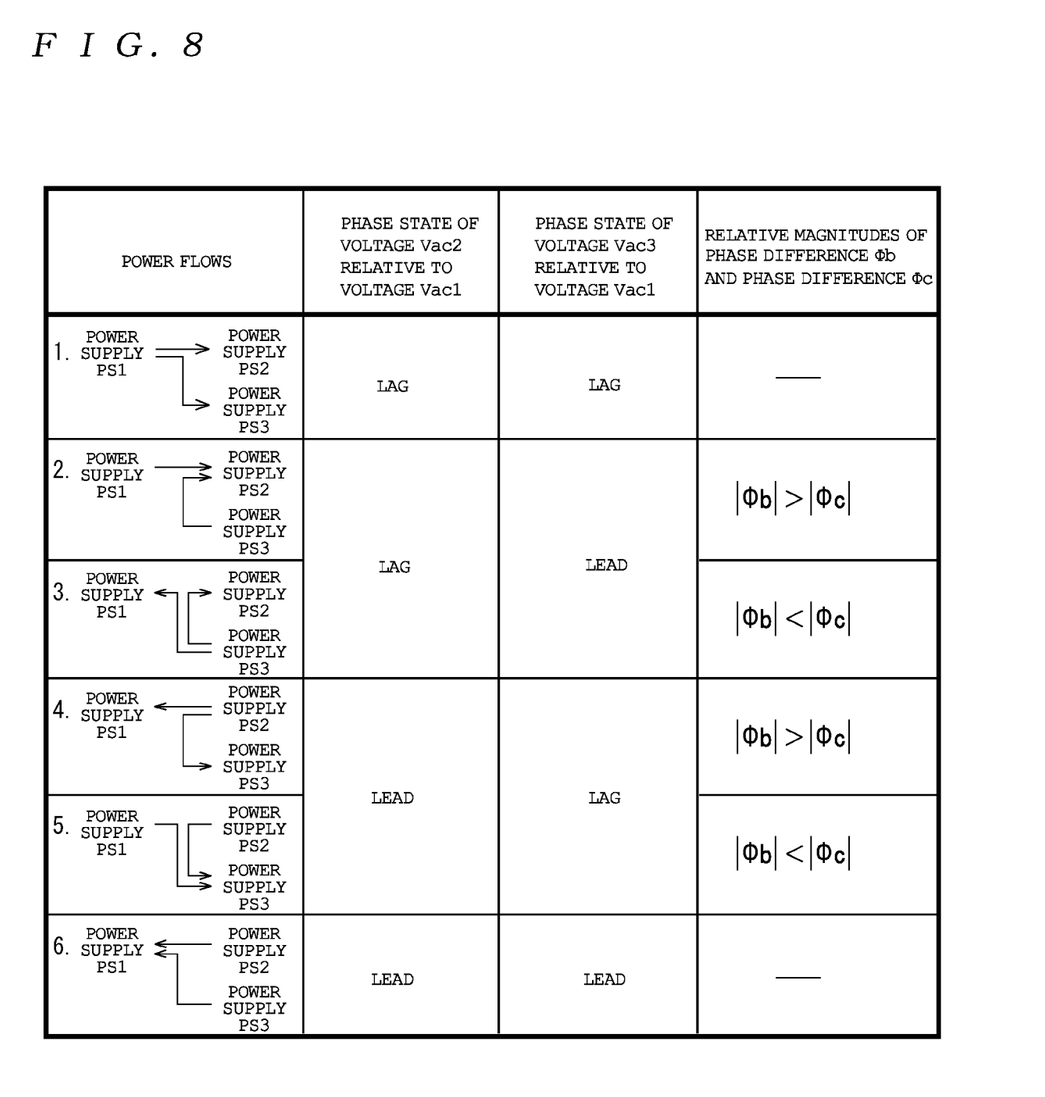
FIG. 8 is a diagram useful in explaining power flows (the directions in which power is supplied) between the power supplies PS1, PS2, and PS3, phase states of the voltage Vac2 and voltage Vac3 relative to the voltage Vac1, and the relative magnitudes of the phase differences Φb and Φc in the converter apparatus.

In other words, the control unit 8 executes switching control (phase control) over the switches 12 to 15, 22 to 25, and 32 to 35 of the switching circuits 11, 21, and 31 so that the phase states of the voltages Vac2 and Vac3 relative to the voltage Vac1 and the relative magnitudes of the phase differences Φb and Φc become phase states and relative magnitudes that correspond to desired power flows out of the six types of power flows depicted in FIG. 8.

Accordingly, with the converter apparatus 1A, it is possible to supply power between three power supplies PS1, PS2, and PS3, or in other words, it is possible to freely exchange power between the three power supplies PS1, PS2, and PS3. That is, it is possible to supply power from any one of the power supplies to the two other power supplies and possible to supply power from any two power supplies to the remaining power supply (more specifically, the power flows between the power supplies PS1, PS2, and PS3 can be set at desired power flows selected out of the six types of power flows described above).

For the control unit 8 in the converter apparatus 1A described above, it is possible, by controlling the phase difference Φb between the voltage Vac1 and the voltage Vac2, to perform arbitrary control over the magnitude of the power Pb supplied to the power supply PS2 (i.e., the voltage Vdc2), by controlling the phase difference Φc between the voltage Vac1 and the voltage Vac3, to perform arbitrary control over the magnitude of the power Pc supplied to the power supply PS3 (i.e., the voltage Vdc3), and by controlling the difference between the absolute value of the phase difference Φv and the absolute value of the phase difference Φc, to perform arbitrary control over the magnitude of the power Pa supplied to the power supply PS1 (i.e., voltage Vdc1). This means that it is possible to separately perform arbitrary control over the power Pa, Pb, and Pc supplied to all of the power supplies PS1, PS2, and PS3.

Also, although the converter apparatus 1A uses a configuration where the control unit 8 performs phase control in a range of angles of 0° to 90° (π/2) inclusive when causing the phase of the voltage Vac2 and/or the phase of the voltage Vac3 to lead or lag the phase of the voltage Vac1 (that is, a configuration that performs phase control of the phase of the voltage Vac2 and/or the phase of the voltage Vac3 in a range of angles of −90° (−π/2) to 90° (π/2) inclusive relative to the phase of the voltage Vac1), in place of this configuration, it is also possible to use a configuration where the control unit 8 causes the phase of the voltage Vac2 and/or the phase of the voltage Vac3 to lead the phase of the voltage Vac1 by performing phase control in a range of angles of 90° (π/2) to 180° (π) inclusive with the phase of the voltage Vac1 as a reference and causes the phase of the voltage Vac2 and/or the phase of the voltage Vac3 to lag the phase of the voltage Vac1 by performing phase control in a range of angles of −180° (π) to −90° (π/2) inclusive with the phase of the voltage Vac1 as a reference.

However, by using a configuration that performs phase control in a range of angles of 0° to 90° (π/2) inclusive when performing control that causes the phase to lead or lag (that is, a configuration that performs phase control over the phase of the voltage Vac2 and the phase of the voltage Vac3) in a range of angles of −90° (−π/2) to 90° (π/2) inclusive relative to the phase of the voltage Vac1, it is possible, when a lagging phase (a range of angles of 0° to 90° (π/2) inclusive) is used as a phase that has 0° as a reference, for the converter apparatus 1A to increase the power Pb and Pc in a state where the polarity is positive as the phase lag increases, and possible when a leading phase (a range of angles of −90° (π/2) to 0° inclusive) is used as a phase that has 0° as a reference, for the converter apparatus 1A to increase the power Pb and Pc in a state where the polarity is negative as the phase lead increases. This means that it is possible to control the magnitudes of the power Pb and Pc in a state where the correspondence between the magnitude (extent) of the phase lead or phase lag and the magnitude of the power Pb and Pc is easy to understand.

Note that although the converter apparatus 1A that enables the free exchanging of power between the three power supplies PS1, PS2, and PS3 has been described as one example of a converter apparatus, the number of power supplies that are capable of exchanging power is not limited to three and may be an arbitrary number that is four or higher. As one example, as in the converter apparatus 1B depicted in FIG. 9, the number of power supplies that exchange power can be set at four by adding a fourth DC power supply PS4 (hereinafter also referred to as the "power supply PS4") to the power supplies PS1, PS2, and PS3. The converter apparatus 1B will now be described below. Note that configurations that are the same as in the converter apparatus 1A have been assigned the same reference numerals and duplicated description is omitted.

Figure 9:
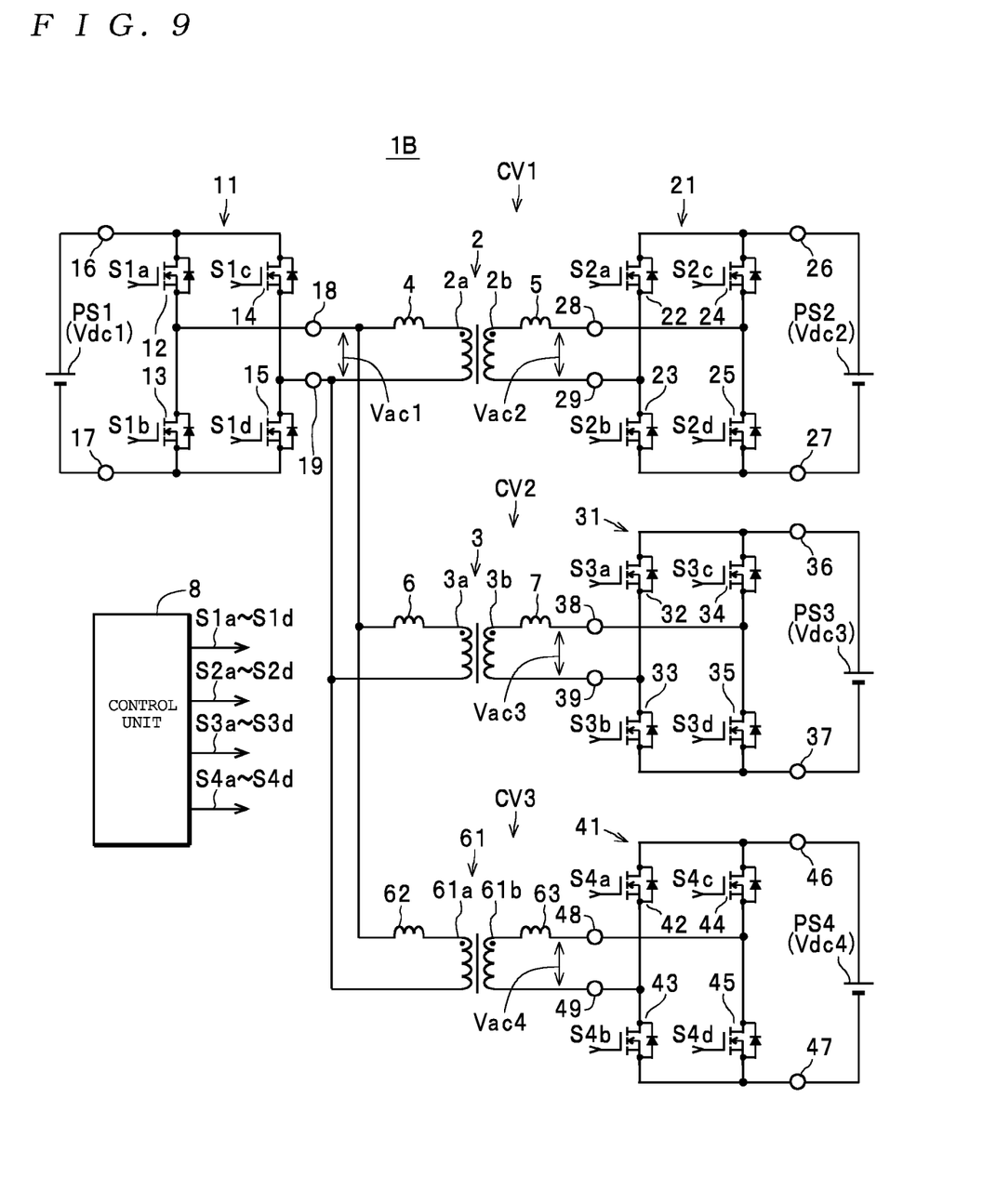
FIG. 9 is a diagram depicting the configuration of another converter apparatus.

First, the configuration of the converter apparatus 1B will be described with reference to FIG. 9. As depicted in FIG. 9, in addition to the configuration of the converter apparatus 1A, the converter apparatus 1B is equipped with a transformer 61 as a third transformer (hereinafter also referred to as the "third transformer 61"), an inductor 62 as a sixth inductor (hereinafter also referred to as the "sixth inductor 62"), an inductor 63 as a fifth inductor (hereinafter also referred to as the "fifth inductor 63"), and a switching circuit 41 as a fourth switching circuit (hereinafter also referred to as the "fourth switching circuit 41"), and is disposed between the four power supplies PS1, PS2, PS3, and PS4.

More specifically, a pair of third windings 61a and 61b that are magnetically coupled are formed in the third transformer 61. The third transformer 61 is separately constructed to the first and second transformers 2 and 3 and the windings 61a and 61b are not magnetically coupled to the windings 2a and 2b or to the windings 3a and 3b. Also, since the number of turns N3a in the winding 61a is set equal to the number of turns N1a, it is assumed that a relationship γ (=N1a/N3b) is established for the number of turns N3a and the number of turns N3b in the winding 61b.

As one example, the sixth inductor 62 and the fifth inductor 63 are constructed of leakage inductances of the third transformer 61. It is also assumed that the inductance values of the sixth inductor 62 and the fifth inductor 63 are expressed by the symbols L3a and L3b. Note that by setting the number of turns N3a equal to the number of turns N1a as described above in the present embodiment, the inductance value L3a of the sixth inductor 62 is set equal to the inductance value L1a of the first inductor 4 (L3a=L1a). For this reason, it is assumed below that the inductance value of the sixth inductor 62 is expressed by the symbol L1a. Note that in place of the leakage inductances, the sixth inductor 62 and the fifth inductor 63 may be constructed of inductors that are externally attached to the third transformer 61.

In addition to switching control over the switches 12 to 15, 22 to 25, and 32 to 35 that construct the first switching circuit 11, the second switching circuit 21, and the third switching circuit 31, the control unit 8 executes switching control over the switches 42 to 45, described later, that construct the fourth switching circuit 41. More specifically, by controlling the respective phases of driving signals S4a to S4d (voltage signals that have rectangular waveforms and as one example a duty ratio of 0.5) for the switches 42 to 45 in addition to the signals S1a to S1d, S2a to S2d, and S3a to S3d for the switches 12 to 15, 22 to 25, and 32 to 35, the control unit 8 executes switching control for the switches 12 to 15, 22 to 25, 32 to 35, and 42 to 45 so as to finally control the phase difference Φb between the voltage Vac2 and the voltage Vac1, the phase difference Φc between the voltage Vac3 and the voltage Vac1, and a phase difference Φd between a voltage Vac4, which is generated between AC input/output units 48 and 49, described later, of the fourth switching circuit 41, and the voltage Vac1 (that is, the control unit 8 executes phase control over the voltages Vac1, Vac2, Vac3, and Vac4).

The AC input/output units 18 and 19 of the first switching circuit 11 are also connected via the sixth inductor 62 to one winding 61a out of the windings 61a and 61b of the third transformer 61. As one example in the present embodiment, the sixth inductor 62 is connected between the AC input/output unit 18 and one end of the winding 61a. The AC input/output unit 19 is connected to the other end of the winding 61a.

The fourth switching circuit 41 is constructed of the four switches 42, 43, 44, and 45 that are connected in a full bridge configuration in a state where DC input/output units 46 and 47 are connected to the power supply PS4 so that the DC input/output unit 16 side becomes a high potential. The AC input/output units 48 and 49 are connected via the fifth inductor 63 to the other winding 61b out of the windings 61a and 61b of the third transformer 61, so that the fourth switching circuit 41 is capable of converting power between DC and AC (i.e., between a fourth DC voltage Vdc4 (the voltage of the power supply PS4, hereinafter also referred to as the "voltage Vdc4") and a voltage Vac4 as a fourth voltage generated across the AC input/output units 48 and 49). As one example in the present embodiment, the fifth inductor 63 is connected between the AC input/output unit 48 and one end of the other winding 61b. The AC input/output unit 49 is connected to the other end of the other winding 61b.

Although freewheel diodes are connected in parallel to each of the switches 42 to 45 as depicted in FIG. 9, when the switches 42 to 45 are constructed of field effect transistors (MOSFET), it is possible to use the parasitic diodes of the transistors.

Also, with the converter apparatus 1B configured as described above, in addition to the first DAB converter CV1 and the second DAB converter CV2 described above, another DAB-type bidirectional converter (hereinafter referred to as the "third DAB converter CV3") is constructed by the third transformer 61 and the first switching circuit 11 and the fourth switching circuit 41 that are connected to each other via the third transformer 61.

For the third DAB converter CV3 also, in the same way as the DAB converters CV1 and CV2 described above, although not illustrated, when the phase difference between the voltage Vac4 and the voltage Vac1 with the phase of the voltage Vac1 as the reference is expressed as $\Phi d$ (where $0 \leq \Phi d \leq \pi/2$), the power Pd outputted (supplied) from the power supply PS1 to the power supply PS4 is expressed by Expression (4) below. Accordingly, when the phase of the voltage Vac4 lags the voltage Vac1 (i.e., when $\Phi d$ is positive), the third DAB converter CV3 supplies power from the power supply PS1 to the power supply PS4 (Pd>0), but when the phase of the voltage Vac4 leads the voltage Vac1 (i.e., when $\Phi d$ is negative), the third DAB converter CV3 supplies minus power from the power supply PS1 to the power supply PS3 (Pd<0, which means that power is supplied from the power supply PS4 to the power supply PS1). Also, in the third DAB converter CV3, as $|\Phi d|$ increases from zero, it is possible to gradually increase the absolute value of the power Pd from zero.

$$Pd = (Vdc1 \times (1/\gamma) \times Vdc4)/[\omega((1/\gamma)^2 \Delta L1a + L3b)] \times \Phi d \times (1 - |\Phi d|/\pi) \quad (4)$$

Also, with the converter apparatus 1B, based on the operation of the DAB converters CV1, CV2, and CV3 described above, the power Pa supplied from the power supplies PS2, PS3, and PS4 to the power supply PS1 is expressed by Expression (5) below.

$$Pa = -Pb - Pc - Pd \quad (5)$$

Figure 10:
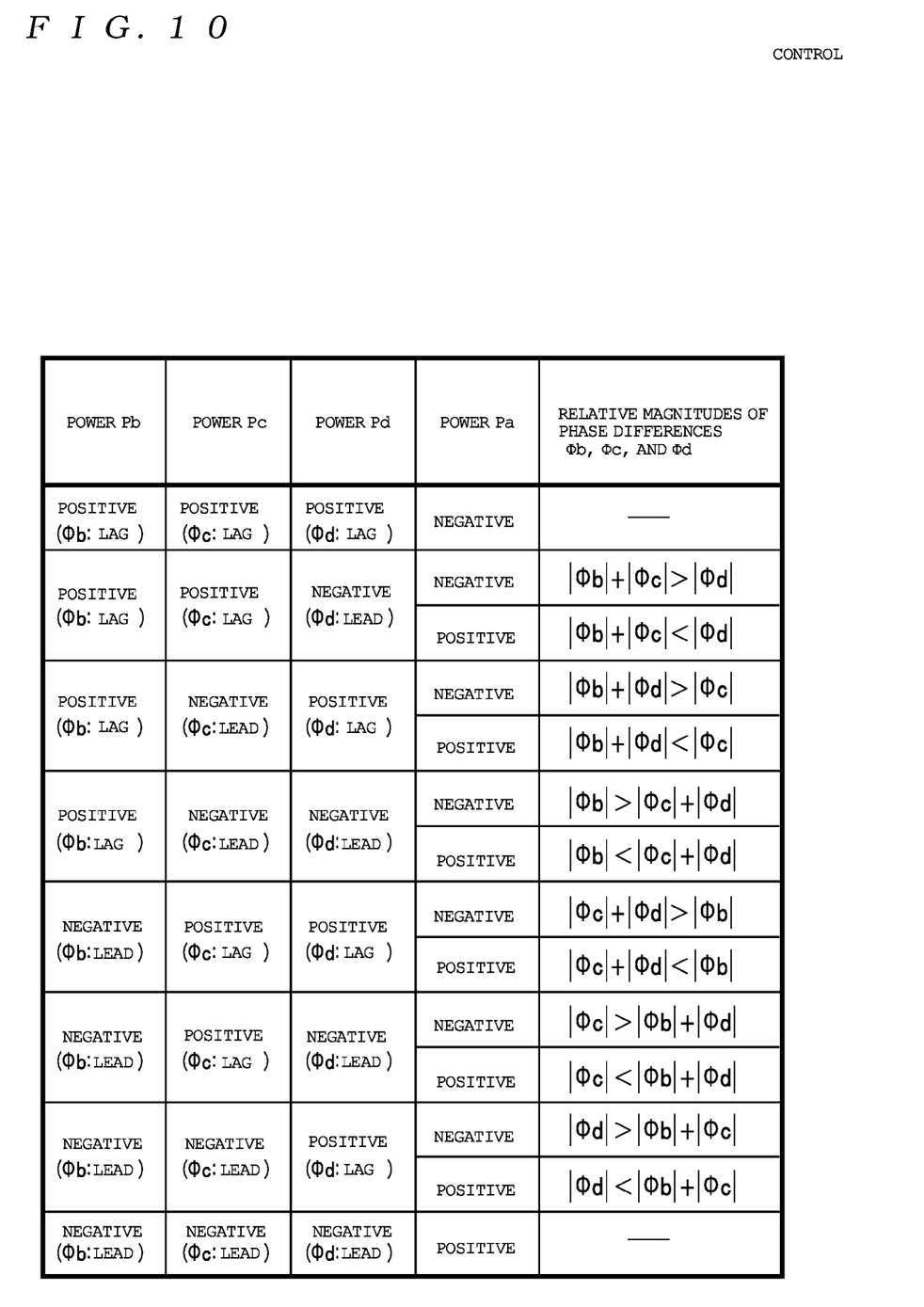
FIG. 10 is a diagram useful in explaining respective polarities of each power Pb, Pc, Pd, and Pa supplied from power supplies PS2, PS3, PS4, and PS1 at the other converter apparatus (that is, power flows (the directions in which power is supplied) between the power supplies PS1, PS2, PS3, and PS4), phase states of the voltage Vac2, the voltage Vac3, and the voltage Vac4 relative to the voltage Vac1, and the relative magnitudes of the phase differences Φb, Φc, and Φd.

Accordingly, with the converter apparatus 1B, based on the phase state of the voltage Vac2 relative to the voltage Vac1 (i.e., whether the voltage Vac2 leads or lags the voltage Vac1 (or whether the polarity of the phase difference $\Phi b$ is positive or negative)), the phase state of the voltage Vac3 relative to the voltage Vac1 (i.e., whether the voltage Vac3 leads or lags the voltage Vac1 (or whether the polarity of the phase difference $\Phi c$ is positive or negative)), and the phase state of the voltage Vac4 relative to the voltage Vac1 (i.e., whether the voltage Vac4 leads or lags the voltage Vac1 (or whether the polarity of the phase difference $\Phi d$ is positive or negative)), it is possible to freely define an exchanging of power between the power supplies PS1, PS2, PS3, and PS4 so that the power Pa, Pb, Pc, and Pd produce any one out of the fourteen types of power flows depicted in FIG. 10. That is, it is possible to arbitrarily select one of supplying power from any one of the DC power supplies to the three other DC power supplies, supplying power from any two DC power supplies to the other two DC power supplies, and supplying power from any three of the DC power supplies to the remaining DC power supply.

Figure 11:
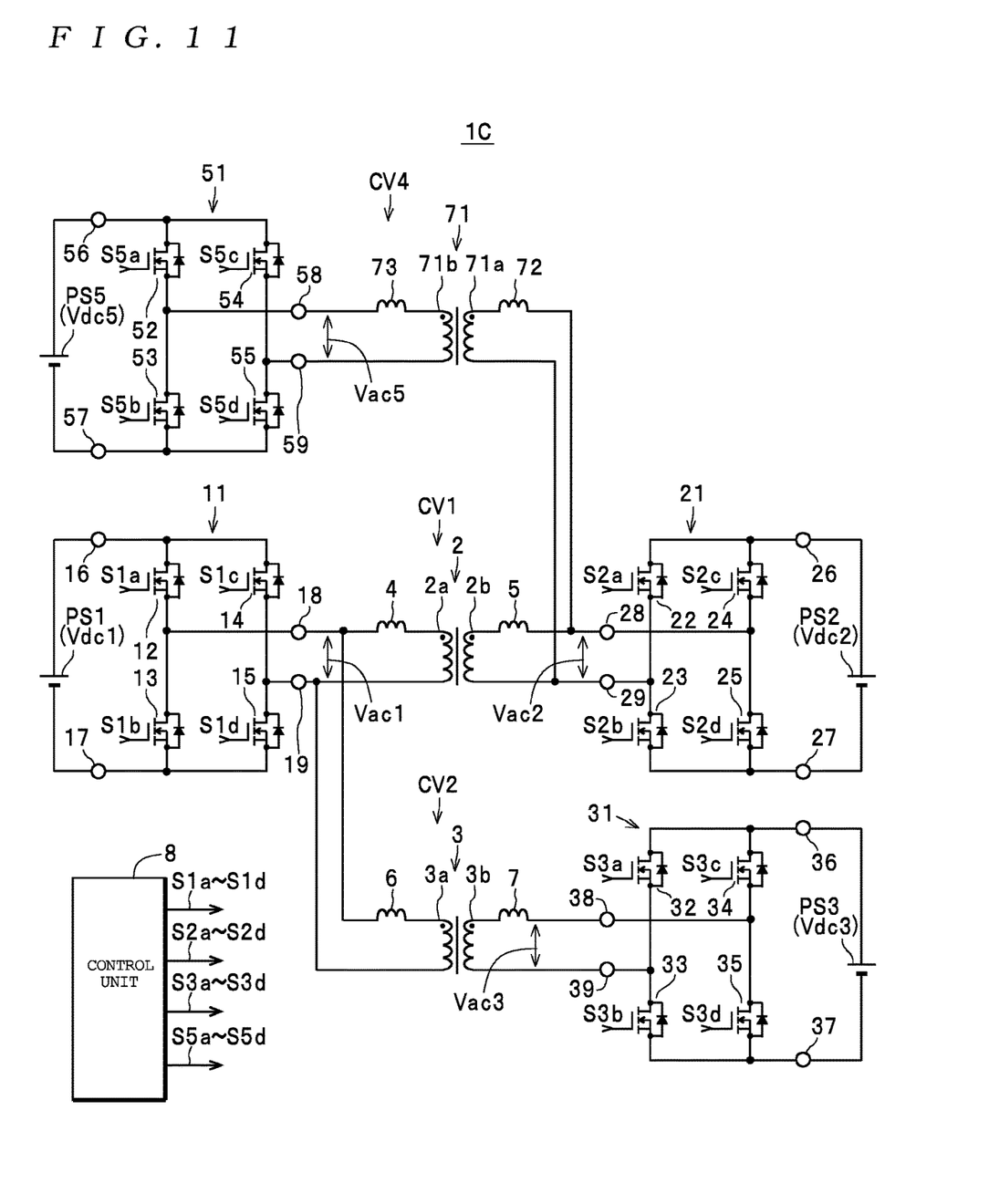
FIG. 11 is a diagram depicting the configuration of another converter apparatus.

Also, although the converter apparatuses 1A and 1B described above use a configuration where a plurality of switching circuits (the two switching circuits 21 and 31 in the converter apparatus 1A and the three switching circuits 21, 31, and 41 in the converter apparatus 1B) are connected via separate transformers to the AC input/output units 18 and 19 of one switching circuit 11, like a converter apparatus 1C depicted in FIG. 11, it is also possible with this configuration (i.e., a configuration where two switching circuits 21 and 31 are connected via the transformers 2 and 3 to the AC input/output units 18 and 19 of one switching circuit 11) to connect a switching circuit 51 as another fourth switching circuit via a transformer 71 as another third transformer to one pair of AC input/output units (in the illustrated example, the AC input/output units 28 and 29) out of the AC input/output units 28 and 29 of the second switching circuit 21 and the AC input/output units 38 and 39 of the second switching circuit 31. Note that configurations that are the same as in the converter apparatus 1B have been assigned the same reference numerals and duplicated description is omitted.

In the converter apparatus 1C, yet another DAB-type bidirectional converter (hereinafter referred to as the "fourth DAB converter CV4") is constructed by the transformer 71 and the switching circuit 21 and the switching circuit 51 that are connected to each other via the transformer 71.

A pair of windings 71$a$ and 71$b$ (with the respective number of turns N4$a$ and N4$b$) that are magnetically coupled are formed in the transformer 71. Also, the transformer 71 is constructed separately to the first and the second transformers 2 and 3, and the windings 71$a$ and 71$b$ are not magnetically coupled to the windings 2$a$ and 2$b$ or the windings 3$a$ and 3$b$. An inductor 72 as another sixth inductor and an inductor 73 as another fifth inductor are constructed for example of leakage inductances of the transformer 71. The inductance values of the inductor 72 and the inductor 73 are expressed by the symbols L4$a$ and L4$b$. One winding 71$a$ out of the windings 71$a$ and 71$b$ of the transformer 71 is connected via the inductor 72 to the AC input/output units 28 and 29 of the second switching circuit 21. Also, in the present embodiment, the number of turns N4$a$ in the winding 71$a$ is set equal to the number of turns N1$b$ in the winding 2$b$. By doing so, the inductance value L4$a$ of the inductor 72 is set equal to the inductance value L4$b$ of the second inductor 5 (L4$a$=L1$b$). Note that in place of leakage inductances, the inductors 72 and 73 may be constructed of inductors that are externally attached to the transformer 71.

The switching circuit 51 is constructed of the four switches 52, 53, 54, and 55 that are connected in a full bridge configuration in a state where DC input/output units 56 and 57 are connected to the power supply PS5 as another fourth DC power supply so that the DC input/output unit 56 side becomes a high potential. The AC input/output units 58 and 59 of the switching circuit 51 are connected via an inductor 73 to the other winding 71$b$ out of the windings 71$a$ and 71$b$ of the transformer 71, so that the switching circuit 51 is capable of power conversion between DC and AC (i.e., between a DC voltage Vdc5 (the voltage of the power supply PS5, hereinafter also referred to as the "voltage Vdc5") as another fourth DC voltage and an AC voltage Vac5 (hereinafter also referred to as the "voltage Vac5") as another fourth voltage generated between the AC input/output units 58 and 59). As one example in the present embodiment, the inductor 73 is connected between the AC input/output unit 58 and one end of the other winding 71$b$. The AC input/output unit 59 is connected to the other end of the other winding 71$b$.

With the converter apparatus 1C also, based on the phase state of the voltage Vac2 relative to the voltage Vac1 (i.e., whether the voltage Vac2 leads or lags the voltage Vac1), the phase state of the voltage Vac3 relative to the voltage Vac1 (i.e., whether the voltage Vac3 leads or lags the voltage Vac1), and additionally the phase state of the voltage Vac5 relative to the voltage Vac2 (i.e., whether the voltage Vac5 leads or lags the voltage Vac2), it is possible to freely define the exchanging of power (i.e., "power flows") between the power supplies PS1, PS2, PS3, and PS5.

Note that although the respective transformers 2 and 3 of the converter apparatus 1A described above are constructed separately and the respective pairs of windings (the windings 2$a$ and 2$b$ and the windings 3$a$ and 3$b$) are not magnetically coupled to each other, the present invention is not limited to this, so that the transformers 2 and 3 only need to be functionally divided and may be constructed of a single transformer, for example by physically sharing a magnetic core between the transformers. Also, although the transformers 2, 3, and 61 of the converter apparatus 1B described above are constructed separately and the respective pairs of windings (the windings 2a and 2b and the windings 3a and 3b, the windings 2a and 2b and the windings 61a and 61b, the windings 3a and 3b and the windings 61a and 61b) are not magnetically coupled to each other, the present invention is not limited to this, so that the transformers 2, 3, and 61 only need to be functionally divided and an arbitrary pair out of the transformers 2, 3, and 61 may be constructed of a single transformer or all of the transformers may be constructed of a single transformer. Also, in the same way as the transformers 2, 3, 61 of the converter apparatus 1B described above, an arbitrary pair out of the transformers 2, 3, and 71 of the converter apparatus 1C described above may be constructed of a single transformer, or all of the transformers may be constructed of a single transformer.

For ease of understanding the operation of the power flows according to the phase differences Φ, the converter apparatuses 1A and 1B described above have example configurations where the respective numbers of turns N1a, N2a, and N3a of the windings 2a, 3a, and 61a are set equal and the inductance values L1a, L2a, and L3a of the inductors 4, 6, and 64 are also set equal. However, the present invention is not limited to these configurations, so that at least one of the numbers of turns N1a, N2a, and N3a may be set differently. It is also possible to use a configuration where all of the numbers of turns are different, and/or where at least one of the inductance values L1a, L2a, and L3a differs to the other values or where all of the inductance values L1a, L2a, and L3a differ. For the converter apparatus 1C described above also, as described above, an example configuration is used where the respective numbers of turns N1a and N2a in the windings 2a and 3a are set equal, the inductance values L1a and L2a of the inductors 4 and 6 are set equal, the respective numbers of turns N1b and N4a in the windings 2a and 71a are set equal, and the inductance values L1b and L4a of the inductors 5 and 72 are set equal. However, the present invention is not limited to this configuration and it is also possible to use a configuration where the respective numbers of turns N1a and N2a in the windings 2a and 3a are different numbers, the inductance values L1a and L2a of the inductors 4 and 6 are different values, the respective numbers of turns N1b and N4a in the windings 2a and 71a are different numbers, and/or the inductance values L1b and L4a of the inductors 5 and 72 are different values.

Also, although the converter apparatus 1A that is equipped with three switching circuits 11, 21, and 31 and is capable of freely exchanging power between the three power supplies PS1, PS2, and PS3, the converter apparatus 1B that is equipped with four switching circuits 11, 21, 31, and 41 and is capable of freely exchanging power between the four power supplies PS1, PS2, PS3, and PS4, and the converter apparatus 1C that is equipped with four switching circuits 11, 21, 31, and 51 and is capable of freely exchanging power between the four power supplies PS1, PS2, PS3, and PS5 have been described as examples of converter apparatuses, although not illustrated, by adapting the respective configurations of the converter apparatuses 1B and 1C, it is possible to set the number of switching circuits at a number n which is five or more, and to set the number of power supplies that exchange power at n.

What is claimed is:
1. A converter apparatus comprising:
a first transformer in which a pair of first windings are formed;
a first switching circuit that is constructed of four switches connected in a full bridge configuration, has direct current (DC) input/output units connected to a first DC power supply, has alternating current (AC) input/output units connected via a first inductor to one winding out of the pair of first windings of the first transformer, and converts power;
a second switching circuit that is constructed of four switches connected in a full bridge configuration, has DC input/output units connected to a second DC power supply, has AC input/output units connected via a second inductor to another winding out of the pair of first windings of the first transformer, and converts power;
a second transformer in which a pair of second windings are formed, with one winding out of the pair of second windings being connected via a third inductor to the AC input/output units of the first switching circuit;
a third switching circuit that is constructed of four switches connected in a full bridge configuration, has DC input/output units connected to a third DC power supply, has AC input/output units connected via a fourth inductor to another winding out of the pair of second windings of the second transformer, and converts power; and
a control unit that executes switching control over the switches of the first switching circuit, the second switching circuit, and the third switching circuit to have power supplied between the first DC power supply, the second DC power supply, and the third DC power supply.

2. The converter apparatus according to claim 1, wherein the control unit controls directions of supplying of power between the first DC power supply, the second DC power supply, and the third DC power supply to arbitrary directions by executing phase control over a phase of a second voltage, which is generated between the AC input/output units of the second switching circuit and has a phase of a first voltage generated between the AC input/output units of the first switching circuit as a reference, and over a phase of a third voltage, which is generated between the AC input/output units of the third switching circuit and has the phase of the first voltage as a reference, the phase control being selected out of:
phase control that sets the phase of the second voltage and the phase of the third voltage at phases that lead the phase of the first voltage;
phase control that sets the phase of the second voltage and the phase of the third voltage at phases that lag the phase of the first voltage; and
phase control that sets one phase out of the phase of the second voltage and the phase of the third voltage at a phase that leads the phase of the first voltage and another phase at a phase that lags the phase of the first voltage, and controls relative magnitudes of an absolute value of a phase difference between the first voltage and the second voltage and an absolute value of a phase difference between the first voltage and the third voltage.

3. The converter apparatus according to claim 2, wherein the control unit arbitrarily controls a magnitude of the power supplied to the second DC power supply by controlling the phase difference between the first voltage and the second voltage, arbitrarily controls a magnitude of the power supplied to the third DC power supply by controlling the phase difference between the first voltage and the third voltage, and arbitrarily controls a magnitude of the power supplied to the first DC power supply by controlling a difference between an absolute value of the phase difference between the first voltage and the second voltage and an absolute value of the phase difference between the first voltage and the third voltage.

4. The converter apparatus according to claim 2, wherein the control unit performs phase control that sets phases that lead the phase of the first voltage and phases that lag the phase of the first voltage respectively within a range of 0 to 90°, inclusive.

5. The converter apparatus according to claim 3, wherein the control unit performs phase control that sets phases that lead the phase of the first voltage and phases that lag the phase of the first voltage respectively within a range of 0 to 90°, inclusive.

6. The converter apparatus according to claim 1, further comprising:
a third transformer in which a pair of third windings are formed; and
a fourth switching circuit that is constructed of four switches connected in a full bridge configuration, has DC input/output units connected to a fourth DC power supply, has AC input/output units connected via a fifth inductor to one winding out of the pair of third windings of the third transformer, and converts power,
wherein another winding out of the pair of third windings of the third transformer is connected, via a sixth inductor, to one out of the AC input/output units of the first switching circuit and the AC input/output units of the second switching circuit.

* * * * *